Nov. 8, 1949

A. A. ERICSON 2,487,321

SPEED RESPONSIVE VARIABLE CAPACITY
ROTARY FLUID MOTOR HAVING FLUID
ACTUATED RADIALLY SLIDING VANES

Filed July 31, 1945

INVENTOR
ALBERT A. ERICSON
BY
Moses, Nolte, Crews + Perry
ATTORNEYS

Nov. 8, 1949　　　　　A. A. ERICSON　　　　　2,487,321
SPEED RESPONSIVE VARIABLE CAPACITY
ROTARY FLUID MOTOR HAVING FLUID
ACTUATED RADIALLY SLIDING VANES
Filed July 31, 1945　　　　　　　　　　　　3 Sheets-Sheet 2

INVENTOR
ALBERT A. ERICSON.
BY
Moses, Nolte, Crews & Berry
ATTORNEYS

Nov. 8, 1949

A. A. ERICSON 2,487,321

SPEED RESPONSIVE VARIABLE CAPACITY
ROTARY FLUID MOTOR HAVING FLUID
ACTUATED RADIALLY SLIDING VANES

Filed July 31, 1945

INVENTOR
ALBERT A. ERICSON
BY
Moses, Nolte, Crews & Berry
ATTORNEYS

Patented Nov. 8, 1949

2,487,321

UNITED STATES PATENT OFFICE 2,487,321

SPEED RESPONSIVE VARIABLE CAPACITY ROTARY FLUID MOTOR HAVING FLUID ACTUATED RADIALLY SLIDING VANES

Albert A. Ericson, Massapequa Park, N. Y., assignor to The Farmingdale Corporation, a corporation of New York Application July 31, 1945, Serial No. 607,972

8 Claims. (Cl. 121—87)

This invention relates to rotary hydraulic machines embodying novel features of construction applicable to both pumps and motors but having special utility as applied to motors of the rotary type having variable displacement and which may be controlled in such manner as to deliver more or less constant power within a wide variation in speeds of rotation.

In hydraulic motors of ordinary construction power delivered by the motor increases with the speed, assuming that the pressure of the operating medium is substantially constant. For some purposes such increase in power is objectionable because excessive power not required may damage the machinery or the instrumentality to which the power is being applied and also because if more power is delivered than is needed it is necessarily wasted, resulting in loss of economy.

The present invention provides a motor construction which may be controlled in such way as to deliver the required amount of power throughout a wide range of speeds, there being no increase in power in direct functional relationship to increase in speed.

The motor of the present invention may be utilized for many purposes where hydraulic motors are utilized. It finds special applicability, however, for the driving of machine tools, such as lathes, drill presses, milling machines, grinders, etc. It has been common practice in using hydraulic motors to drive such machinery to provide a motor which had adequate power to do what was required of it when operating at slow speed, and which when operating at high speed produced a large surplus of power but required for its operation an amount of operating fluid greatly in excess of that required to produce all of the power which could be utilized. A large volume of the operating fluid was therefore by-passed and wasted and the fluid circulated and recirculated without doing any useful work, resulting in serious loss in economy.

With the foregoing considerations in view, among the objects of the invention are to provide a hydraulic motor in which the power delivered can be regulated and maintained within the desired range which is needed and can be utilized, irrespective of the speed of operation of the motor, and to provide a motor in which no more operating fluid is utilized than is necessary to produce the requisite amount of power, thereby avoiding losses due to recirculation of an excess of operating fluid.

It is also an object of the invention to provide a rotary hydraulic machine in which the capacity of the working chamber may be varied by shifting a chamber plate or equivalent part bounding the working space with respect to the axis of rotation of the rotor without the necessity for using flexible walls or loose parts for varying the shape or dimensions of the working chamber.

It is also an object of the invention to provide a rotary hydraulic motor in which one or more rotors are provided, each having a plurality of spaced vanes, the vanes of one rotor being alternated with the vanes of another rotor and the spacing of the vanes and location of the inlet and outlet ports being such that the most effective utilization of the operating pressure medium is secured, together with the maximum uniformity of torque and smoothness and efficiency of operation.

It is also an object of the invention to provide a rotary hydraulic machine having rotors provided with vanes moving in and out in the rotors in which means are provided for holding the rotors in their working positions with only such pressure as is required for that purpose, thereby avoiding excessive pressure and wear between the ends of the vanes and the surface in contact with which they work, and it is a further specific object to provide a control for the pressure back of the vanes depending upon the speed of rotation of the rotors.

It is a further object of the invention to provide means for relieving the pressure back of the vanes of the rotor to compensate for surges in pressure due to the in and out movement of the vanes.

It is also an object of the invention to provide a construction of rotary hydraulic machine, suitable for use as a motor or pump, of great simplicity, which is easily built, sturdy in construction, durable and efficient.

The rotary machines of the present invention are particularly designed for use with an operating fluid which is a substantially incompressible liquid such as oil or water, but for some purposes an elastic operating fluid may be used.

Other objects and advantages of the invention will appear from the following description and the accompanying drawings, which explain one preferred embodiment of my invention.

Figure 1:
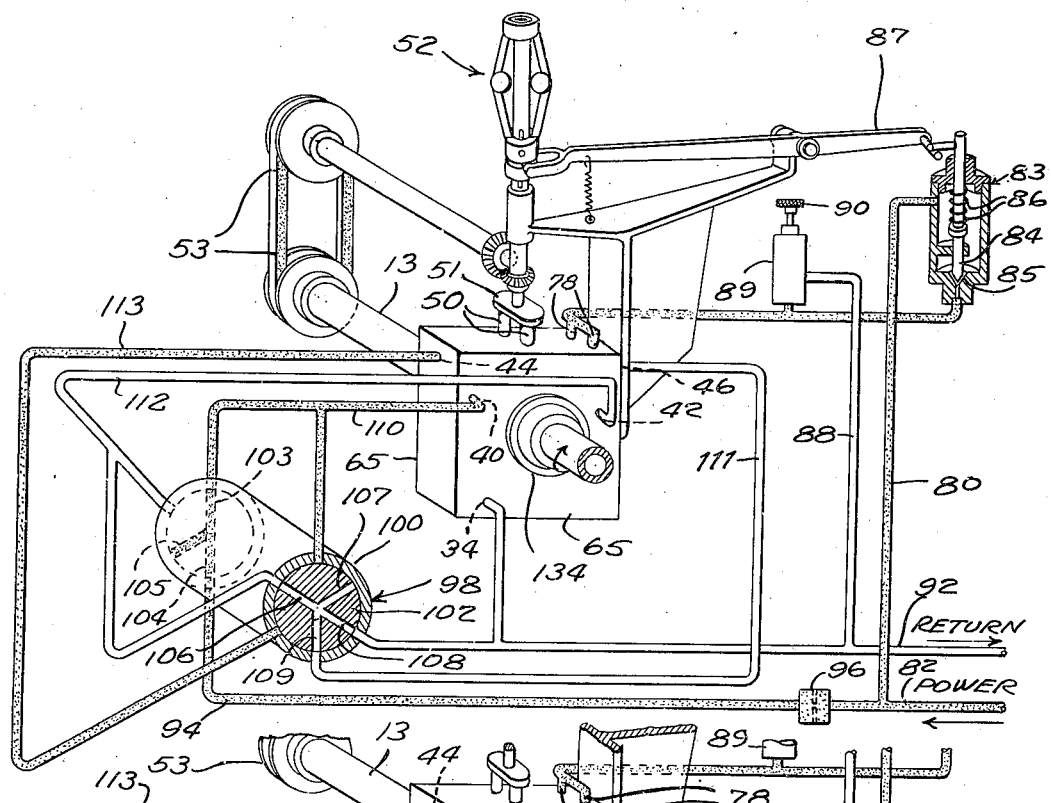
Figure 1 is a schematic diagram showing in perspective a motor embodying the present invention with governor mechanism mounted thereon and showing the control valve and duct connections to the motor, and illustrating the setting of the valve for operating the motor in a clockwise direction.

Referring to the drawings in detail, the particular construction of motor shown for purposes of illustration is provided with a pair of rotors of similar construction but angularly displaced from one another so as to avoid what may be termed a dead center position. For some purposes, however, the motor may consist of but a single rotor or if a more powerful motor is desired, a series of more than two rotors may be utilized. As illustrated, each of the rotors comprises a rotor plate 10 having a central bore 12 which is fitted upon the shaft or spindle 13 to be rotated and may be directly secured thereto as by a key 14. When the rotor is used for driving a machine tool, for example, it may be keyed directly to the spindle of the machine, such as the head stock spindle of a lathe, arbor of a milling machine or grinder, or the like. The rotor plate is provided with a series of slots 16, shown as radial in the illustrated example, and in each of these slots slides a vane 18. The vanes are urged outwardly by springs 20 and by fluid pressure as hereinafter described.

Figure 4:
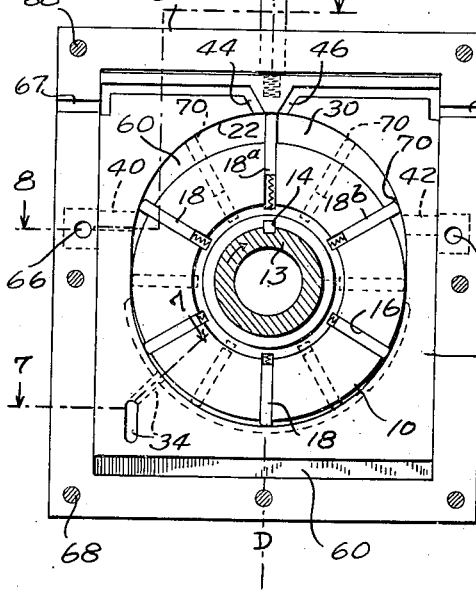
Figure 4 is a front elevation of the motor with one of the cover plates removed, the motor shaft being shown in transverse section, one of the chamber plates being shown adjusted to position to give maximum voltage to the working chamber.
Figure 5:
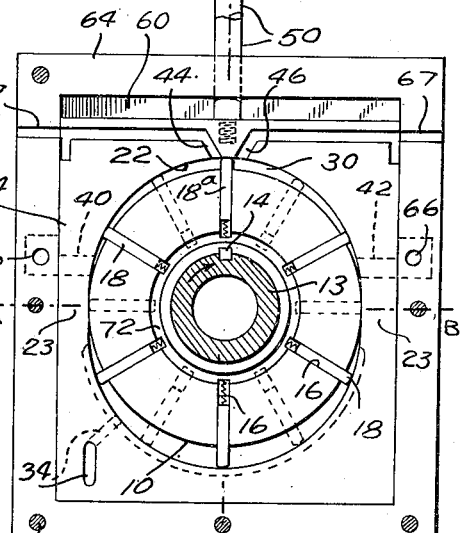
Figure 5 is a view similar to Fig. 4 showing the chamber plate adjusted to provide a reduced volume for the working chamber.
Figure 7:
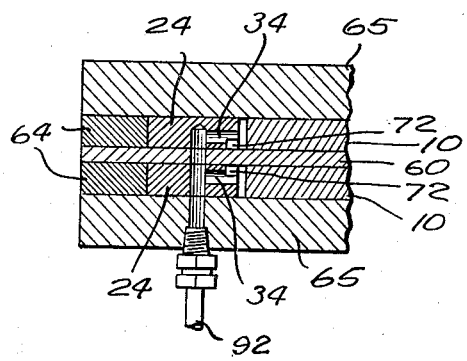
Figure 7 is a horizontal sectional view through a part of the motor taken at the position indicated by line 7—7 of Fig. 4.

Each of the rotors is mounted to rotate in an opening 22 formed in a chamber plate 24. The shape of the opening 22 is important as it is not circular but is somewhat elongated. Its smaller diameter, which in the illustration is along the horizontal axis A—B (Figs. 4 and 5), is the same as the diameter of the rotor, whereas its longer dimension, along the vertical axis C—D, is such as to permit a limited movement in that direction of the chamber plate with respect to the rotor. The curvature at the two ends of the opening 22 is preferably the same or substantially the same as the circular curvature of the rotor. The curved ends are connected by short parallel wall portions 23 which remain in contact with the periphery of the rotor at the ends of the axis A—B as the chamber plate is shifted. The chamber plate is mounted to be moved in the direction of the axis C—D. When moved as far as possible in one direction, as in the vertical upward direction as shown in Fig. 4, then the lower end of the opening 22 conforms more or less closely to the circumference of the rotor. The top of the opening is then spaced a considerable distance from the circumference of the rotor so as to leave a crescent-shaped space 30 which is the working chamber of the motor. The chamber plate may be adjusted downwardly from this position to any desired degree, thereby reducing the volume of the working chamber. For instance the working chamber may be reduced to a small crescent-shaped space, as indicated in Fig. 5. In this construction only the crescent-shaped space 30 is used as a working chamber, the space below the axis A—B being unused. The space below the axis A—B is sealed off from the working chamber by the engagement between the rotor at the ends of its horizontal axis and the walls of the opening 22 which are in close contact therewith at the ends of the axis A—B. The space below the axis A—B is preferably vented, as by means of a pressure relief port 34 which is in communication with such space for all positions of the chamber plate.

The form of working chamber described, with the chamber plate and rotor relatively movable but with the rotor always in sealing contact at the ends of its transverse axis with the walls of the chamber plate, provides for actual variation in volumetric capacity of the working chamber. The construction is therefore to be clearly differentiated from variable displacement pumps or the like in which the eccentricity of the rotor with respect to the working chamber is adjustable without changing the volume of the working chamber.

A pair of ports 40 and 42 is provided in the chamber plate communicating with the working space 30, one of these ports acting as an inlet port and the other as an exhaust port. By the use of a suitable reversing valve either port may be made an inlet port by connecting with a source of fluid under pressure, while the other port is connected with an exhaust or outlet duct. A pair of exhaust ports in the chamber plates are also provided communicating with the space 30, these ports being indicated at 44 and 46 and communicating with the space 30 near the 90° position corresponding in the drawing with the axis C—D. These exhaust ports are also controlled by a reversing valve which may be the same as the reversing valve controlling the ports 40 and 42, or may be another valve arranged to operate concurrently therewith. The valve means may be set so that the port 40 is the inlet port and the ports 42 and 46 are open to the exhaust and port 44 is closed. In this condition the motor will operate in a clockwise direction. When the connections to the ports are reversed the motor will operate in a counterclockwise direction. Pressure introduced through the port 40 under the first named condition enters the wedge-shaped spaces behind the successive vanes and applies power to the vanes to rotate the rotor in a well understood manner. After any particular vane passes the port 46 then pressure is relieved through this port and there is thus continuous rotation of the rotor in a clockwise direction. The active working space at any particular time is thus approximately one-half of the crescent-shaped space 30. One half of the space 30 is used for one direction of rotation and the other half is used for the other direction of rotation. The active working space may be increased in the direction of rotation beyond that indicated in the case of non-reversible motors.

Figure 4 shows what may be termed the low speed position of the chamber plate where the space 30 is of the maximum volume of which the motor is capable of adjustment. As this chamber is of maximum volume and will take the maximum amount of operating fluid for any given rate of rotation it will therefore produce the maximum power of which the motor is capable at such speed of rotation. In the ordinary hydraulic motor of the vane type the working space is of constant volume and therefore as the speed of rotation increases the motor will require more of the fluid under pressure. If the pressure of the latter is constant the motor will deliver more and more power as it receives more fluid. This is the condition which the present invention when used as a motor is designed to correct, and this is accomplished by shifting the chamber plate as the speed of rotation increases so as to reduce the volume of the working chamber. This reduces the amount of fluid which the motor will receive per revolution. By properly controlling the position of the plate 24 the amount of fluid taken by the motor can be controlled and kept constant if desired, or otherwise varied as conditions may require, and the power delivered by the motor can likewise be controlled.

The position of the chamber plate 24 may be controlled in any suitable manner, either manually or automatically. Preferably it is controlled automatically by means of a suitable governor which moves the plate through a rod 50. Any suitable governing means may be employed. For purposes of illustration I have shown a conventional centrifugal governor 52 connected to operate the rod 50 and thereby shift the plate 24 depending upon the speed of rotation of the rotor as transmitted to the governor, for example through a belt 53. In place of a centrifugal governor a hydraulic governor or other type governor may be used.

In the particular construction illustrated, two rotors are provided, each having slots and vanes, the slots and vanes of one rotor being arranged alternately or staggered with respect to the slots and vanes in the other rotor. With such a construction the motor is self-starting, as there is no dead center position. The two rotors are shown as mounted each in its own plate 24, the rotors and plates being spaced apart by a separator plate 60. In the construction shown both plates are connected to the governor so as to move together, each being provided with a rod 50 secured to a cross member 51 operatively connected to the governor. The plates 24 slide in rectangular frames 64 and are enclosed by cover plates 65. The frames 64 are provided with pairs of ports 66 and 67 communicating with the ports 40 and 42 and ports 44 and 46 respectively in the chamber plates in all positions of adjustment of the plates. The cover plates, separator plate, and frames are all secured together by suitable means such as screws 68, while both rotors are directly keyed to the shaft or spindle to be rotated.

Figure 6:
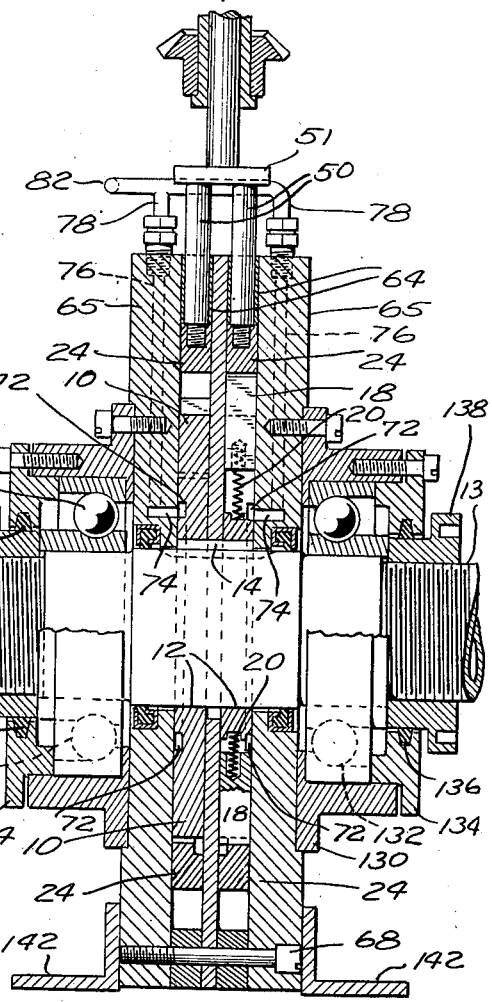
Figure 6 is a longitudinal central sectional view of the motor.
Figure 8:
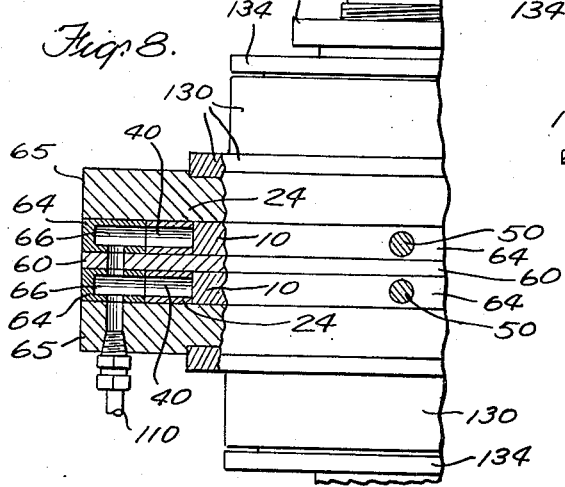
Figure 8 is a view partly in horizontal section taken on line 8—8 of Fig. 4 and partly in top elevation, showing part of the top of the motor.

The details of construction of the motor obviously may be varied as desired, or adapted to suit the particular condition of use. As illustrated, the cover plates have housings 130 (Fig. 6) bolted to their sides and in these housings fit ball bearings 132 in which turn the spindle 13. On the end of each housing is a bearing retainer 134 which may carry a grease retaining packing ring 136 engaging a retaining nut 138 screwed on the spindle. A suitable hydraulic pressure retaining packing ring 140 is preferably mounted to seal the joint between each cover plate and the spindle. The cover plates are held against rotation by being connected to any suitable part of the apparatus, such as the stationary brackets 142.

In the case of motors operated by a substantially incompressible liquid, as in the preferred construction shown, each rotor is preferably provided with six vanes spaced at equal intervals, and the inlet and exhaust ports are so arranged that when the rotor is operating under slow speed conditions, as shown in Fig. 4, one of the vanes has just passed the inlet port while the preceding vane is just about to uncover the exhaust port. In Fig. 4 the vane 18 is shown just as it passes the inlet port while the vane 18a is about to reach the exhaust port 46. As soon as the vane 18a passes the exhaust port 46 the space between the vanes 18 and 18a is relieved of pressure, and therefore there is no further retarding effect or drag due to the liquid in the space between the vanes 18 and 18a. This is no longer an active working space.

The pressure at this time is now acting on the lower or left hand side of the vane 18 through the port 40, and this pressure is thus helping to rotate the rotor. The vane still further ahead, marked 18b in Fig. 4, at this time passes the port 42, and the liquid still in the space between the vanes 18a and 18b is forced out of the port 42. In the meantime it will be seen that where two rotors are employed, as illustrated, the vanes on the second rotor shown in dotted lines in Figs. 4 and 5 are half way between the ports. The vane shown in dotted lines next beyond the vane 18 is in a position to exert its full power due to the pressure of the operating liquid behind it, and will continue to carry the load until it reaches the top of the arc, and in turn passes the port corresponding to the exhaust port 46. Thus there is always a vane in effective position to carry the load on the motor.

Just at, or about the period shown in Fig. 4, when the vane 18a has not yet passed the exhaust port 46, and the vane 18 is passing or has just passed the inlet port 40, there is a slight retarding action or back pressure on the vane 18, but this is compensated for by the pressure on the small area of vane 18 which is now exposed to the pressure acting through the port 40. This leaves the vane of the companion rotor (shown in dotted lines next in advance of vane 18, Fig. 4) able to carry the working load on the motor without loss of effectiveness due to any temporary retarding action of the first rotor. Thus smooth and efficient rotary movement is secured at all times.

In a hydraulic motor of the character illustrated the use of two rotors each having the vanes spaced at 60° intervals, six vanes to each rotor, is the most effective spacing as this permits one vane to pass the inlet opening just before the vane ahead passes the exhaust port. The inlet port (40) is preferably so located that when the chamber plate is in position for slow speed operation (Fig. 4) vane 18 just passes the top of the port opening as the vane 18a reaches top dead center position. When the motor is operating at higher speed, as shown in Fig. 5, then the chamber plate is moved down carrying with it the inlet port (40) so that the vane 18 will pass beyond this port some time before the vane 18a reaches the exhaust port (46). While this will result in a little more drag or retarding action, this result is not serious at the higher speeds of operation because the momentum of rotation will assist in carrying the vanes past the top dead center position. Furthermore the volume of all working spaces is less so that the retarding action is of minor effect.

When the rotary hydraulic device of the present invention is used as a pump, the chamber 30 constitutes the pumping chamber, and when it is of maximum volume the pump will have maximum displacement. The displacement will be reduced as the chamber plate is shifted to decrease the size of the chamber.

Figure 3:
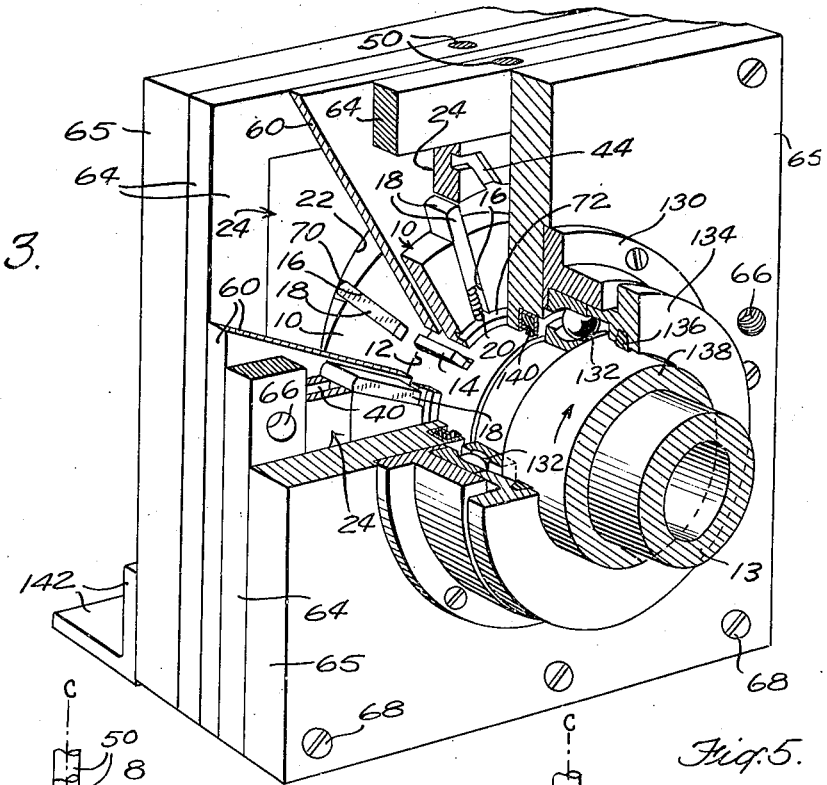
Figure 3 is a perspective view of the motor, parts being broken away to show the interior construction.

Owing to the fact that the rotor is eccentrically mounted with respect to the boundary walls of the chamber, the ends of the vanes are curved or rounded and there are spaces as indicated at 70 between the ends of the vanes and the surface of the chamber wall (Fig. 3). The pressure in the chamber thus acts on the ends of the vanes and tends to drive them down in their slots in the rotor. In order to compensate for this pressure, the working fluid under a reduced pressure is introduced beneath the lower ends of the vanes so as to assist in holding them out. For this purpose a channel 72 is formed in the side of each rotor and fluid is supplied to these channels through ports 74 in the cover plates 65 (Fig. 6), fluid being supplied to these ports through ducts 76 in the cover plates which are supplied by pipes 78 (Fig. 1) from the main power line 82.

In order to regulate the amount of pressure supplied to the channel 72, a reducing valve 83 is mounted in the pipe 80 (Fig. 1). This may be of any suitable form, being shown as comprising a needle valve 84 biased towards a seat 85 by a spring 86. Any suitable means may be provided for adjusting this valve manually, if desired. Preferably, however, the valve is arranged to be adjusted automatically in accordance with the speed of rotation of the motor. This may be accomplished by governing means of any suitable character. As shown the needle valve is connected by a lever 87 with the governor 52 so that as the speed increases the needle valve tends to close. When the speed decreases the governor draws the needle valve up against the force of the spring 86 so as to increase the opening of the valve. In this way pressure passing to the channels 72 may be regulated so as to hold the vanes outwardly under all conditions. More pressure is needed for this purpose when the motor is operating at low speeds because the centrifugal force acting upon the vanes is then small. As the speed increases, however, and the centrifugal force increases, less pressure is required and therefore the valve is permitted to close partly or wholly. Thus no greater pressure is applied to the vanes than is necessary to keep them in contact with the surface of the chamber plate.

There is preferably connected to the pipe 80 (Fig. 1) a by-pass pipe 88 in which there is a relief valve 89 of usual construction, the relief pressure of which may be regulated by hand screw 90. This relief valve prevents the pressure in pipe 80 from ever exceeding a desired maximum. The relief valve is also very important as it takes care of surges in pressure in the channels 72 caused by the in and out movement of the vanes. These surges of pressure occur partly because of the eccentric mounting of the rotor in the chamber plate, some of the vanes moving further than others, so that the volume displaced by vanes being pushed in is not fully compensated for by the volume taken up by vanes moving out. Also surge is produced because the vanes being pushed in may be forced in more suddenly than the vanes will move out under the influence of the springs and pressure. Any increases in pressure produced by this surging are relieved by the relief valve and during operation continual spurting or bleeding of liquid relieved through the relief valve can be observed.

Figure 2:
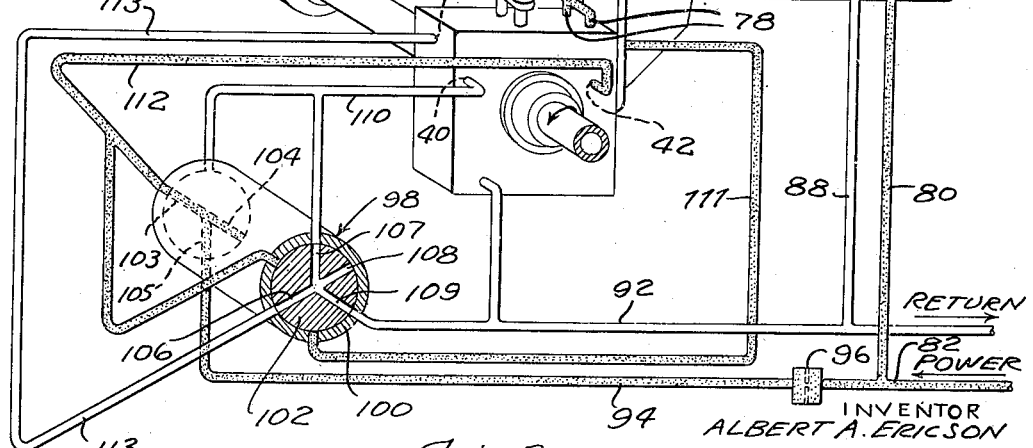
Figure 2 is a view similar to Fig. 1 showing the setting of the valve and connections for operating the motor in a counterclockwise direction.

Pressure is supplied to the motor from the power line 82 in which pressure at a definite maximum is maintained. The pressure passes to the motor through pipe 94 in which is a fixed or adjustable restriction 96 (Fig. 1). Also in the pipe 94 is a control valve 98 which is illustrated as both a throttle valve and a reversing valve. Any suitable form of control valve may be used, that shown comprising the sleeve 100 in which is mounted a rotary plug 102. At one end of the plug is a Y-shaped passageway having three branches 103, 104 and 105, and at the other end of the plug is a four-way passageway having branches 106, 107, 108 and 109. When the control valve is set so that the motor will rotate in a clockwise direction, as shown in Fig. 1, then the liquid under pressure is conducted through pipe 94, through passages 104 and 103, to pipe 110 leading to port 40 of the motor. Liquid is discharged from the working chamber of the motor through port 46 to pipe 111 which is in communication at this setting of the valve with the passage 109 in the valve plug, and liquid is also discharged through port 42 which is connected to pipe 112 which at this setting of the valve is connected to passage 106 in the valve plug. The passage 108 in the valve plug is connected to the return pipe 92 so that the liquid from the motor is discharged through the return pipe. When the motor is being operated in a counterclockwise direction then the valve plug is rotated to the position shown in Fig. 2, at which time pipe 94 connects to pipe 112 through valve passages 103 and 105 while return takes place from ports 40 and 44 through pipes 110 and 113 respectively, which at this setting of the valve connect with ports 107 and 106. At this time the port 109 of the valve plug is in communication with the return pipe 92. Obviously the valve plug may be adjusted so as to only partly open the various passageways so that it will act as a throttle valve. While the motor is running slowly it gets the maximum pressure from the power line 82, because while the flow of liquid is of small volume the restriction 96 does not cut down the pressure. When the throttle valve is opened wider to speed up the motor, then a larger volume of liquid starts to flow and as the volume increases the restriction acts to cut the pressure so that at high speeds the motor gets a larger volume of liquid, but gets it at less pressure, and therefore the power of the motor is not increased proportionately to the speed. This is in addition to the control of the power secured by the governor as already described.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principles may be embodied.

I claim:

1. A hydraulic motor comprising a rotary shaft having a pair of rotors mounted thereon, each of said rotors carrying spaced vanes movably mounted therein, and a housing for said rotors, said housing comprising a separator plate between said rotors, a pair of frames having rectangular openings therein, one on each side of said separator plate, a pair of cover plates one on each of said frames, said plates and frames being secured together, and a movable chamber plate slidably mounted in each of said frames between said separator plate and one of said cover plates, each of said chamber plates having an elongated opening therein in which one of said rotors rotates, said opening having curved ends and parallel side walls, the distance between the parallel side walls being equal to the diameter of the rotor so that the rotor fits between the side walls in sealing contact at the ends of a diameter, the vanes in one of said rotors alternating with the vanes in the other rotor, and means for shifting the chamber plates in the direction of the longer dimensions of said openings so as to vary the volume of the working spaces formed between the openings in the chamber plates and the rotors and ports for admission and relief for fluid under pressure opening into said working spaces, there being no inlet for pressure fluid opening into the spaces in the chamber plates at the opposite sides of the rotors from the working spaces.

2. A hydraulic motor comprising a rotary shaft having a pair of rotors mounted thereon, each of said rotors carrying spaced vanes movably mounted therein, and a housing for said rotors, said housing comprising a separator plate between said rotors, a pair of frames having rectangular openings therein, one on each side of said separator plate, a pair of cover plates one on each of said frames, said plates and frames being secured together, and a movable chamber plate slidably mounted in each of said frames between said separator plate and one of said cover plates, each of said chamber plates having an elongated opening therein in which one of said rotors rotates, said opening having curved ends and parallel side walls, the distance between the parallel side walls being equal to the diameter of the rotor so that the rotor fits between the side walls in sealing contact at the ends of a diameter, the vanes in one of said rotors alternating with the vanes in the other rotor, and means for shifting the chamber plates in the direction of the longer dimensions of said openings so as to vary the volume of the working spaces formed between the openings in the chamber plates and the rotors, inlet and exhaust ports in the chamber plates communicating with the working spaces, and passageways in the frames and cover plates for conducting fluid to and from said ports.

3. A hydraulic motor comprising a rotor having recesses therein, vanes mounted to move in and out of said recesses, a chamber plate having an elongated opening therein in which the rotor rotates, said opening having curved end walls and parallel side walls, the distance between said side walls being the same as the diameter of the rotor so that the rotor fits in the opening with sealing contact at the ends of a diameter, means for shifting the chamber plate in the direction of its longer dimension so as to vary the volume of the working space formed between one end of the opening in the plate and the rotor, means for introducing fluid under pressure into said working space, means including a regulating valve for introducing fluid under pressure behind said vanes so as to hold them projected into working position, a governor controlled by the speed of rotation of the rotor, connections from said governor for shifting said chamber plate and connections from said governor for varying the adjustment of said regulating valve.

4. A hydraulic machine comprising a chamber plate having an opening therein, a rotor rotating in said opening and having recesses therein, vanes mounted to move in and out of said recesses, the walls of the opening in said chamber plate and of the rotor constituting a crescent shaped working space, means for shifting the chamber plate laterally with respect to the rotor so as to vary the volumetric capacity of said working space, means for introducing fluid under pressure into said working space, means for introducing fluid under pressure behind said vanes so as to hold them projected into working position, a governor controlled by the speed of rotation of the rotor and means actuated by said governor for shifting said chamber plate and for controlling the pressure behind the vanes.

5. A reversible hydraulic motor comprising a pair of rotors, each having six equally spaced vanes movably mounted therein, the vanes in one rotor alternating with the vanes in the other rotor, and being half way between such alternate vanes, a housing for each rotor having an opening therein with curved ends, and with side walls engaging the rotor at the ends of a diameter so as to form with the rotor a crescent shaped working space, said housing having inlet ports opening into said crescent shaped working space near the tips thereof, and having a pair of exhaust ports opening into said working space near and at opposite sides of the point of maximum width of said space, each exhaust port being spaced slightly more than 60° from the inlet port nearest to it so that a vane working in the space will pass the inlet port before the vane in advance thereof has uncovered the corresponding exhaust port, and valve means controlling both rotors for alternatively connecting one of said inlet ports for each rotor with the source of fluid under pressure and closing the exhaust port nearest to said inlet port for each rotor, and concurrently opening the other inlet and exhaust ports for each rotor to permit the discharge of fluid therefrom.

6. A reversible hydraulic motor as claimed in claim 5 in which the housings for the rotors comprise sliding plates, and means for moving the plates to change the sizes of said crescent shaped working spaces.

7. A reversible hydraulic motor comprising a rotary shaft having a pair of rotors mounted thereon, each of said rotors having a plurality of equally spaced vanes movably mounted therein, the vanes in one rotor alternating with the vanes in the other rotor, and being half way between such alternate vanes, a housing for said rotors comprising a separator plate between the rotors, a pair of frames one on each side of said separator plate, a pair of cover plates, one on each of said frames, said plates and frames being secured together and a movable chamber plate slidably mounted in each of said frames between said separator plate and one of said cover plates, each of said chamber plates having an elongated opening therein in which one of said rotors rotates, said opening having curved ends and parallel side walls, the distance between the parallel side walls being equal to the diameter of the rotor so that the rotor fits between the side walls with sealing contact at the ends of the diameter so as to form with the rotor a cresence shaped working space at one side of the rotor, each of said chamber plates having inlet ports opening into its crescent shaped working space near the tips thereof, and having a pair of exhaust ports opening into said working space near and at opposite sides of the point of maximum width of said space, passageways in the frames and cover plates for conducting fluid to and from said ports, means for moving said chamber plates to change the sizes of said crescent shaped working spaces, and valve means controlling both rotors for alternatively connecting one of said inlet ports for each rotor with a source of fluid under pressure and closing the exhaust port nearest to the inlet port for each rotor and concurrently opening the other inlet and exhaust ports for each rotor to permit the discharge of fluid therefrom.

8. A reversible hydraulic motor comprising a rotary shaft having a pair of rotors mounted thereon, each of said rotors having six equally spaced vanes movably mounted therein, the vanes in one rotor alternating with the vanes in the other rotor, and being half way between such alternate vanes, a housing for said rotors comprising a separator plate between the rotors, a pair of frames one on each side of said separator plate, a pair of cover plates, one on each of said frames, said plates and frames being secured together, and a movable chamber plate slidably mounted in each of said frames between said separator plate and one of said cover plates, each of said chamber plates having an elongated opening therein in which one of said rotors rotates, said opening having curved ends and parallel side walls, the distance between the parallel side walls being equal to the diameter of the rotor so that the rotor fits between the side walls with sealing contact at the ends of the diameter so as to form with the rotor a crescent shaped working space at one side of the rotor, each of said chamber plates having inlet ports opening into said cresent shaped working space near the tips thereof, and having a pair of exhaust ports opening into said working space near and at opposite sides of the point of maximum width of said space, each exhaust port being spaced slightly more than 60° from the inlet port nearest to it so that a vane working in the space will pass the inlet port before the vane in advance thereof has uncovered the corresponding exhaust port, passageways in the frames and cover plates for conducting fluid to and from said ports, means for simultaneously moving said chamber plates to change the size of said crescent shaped working spaces, and valve means controlling both rotors for alternatively connecting one of said inlet ports for each rotor with a source of fluid under pressure and closing the exhaust port nearest to the inlet port for each rotor and concurrently opening the other inlet and exhaust ports for each rotor to permit the discharge of fluid therefrom.

ALBERT A. ERICSON.

REFERENCES CITED

The following references are of record in the file of this patent:

UNITED STATES PATENTS

| Number | Name | Date |
|---|---|---|
| 741,053 | Mattill | Oct. 13, 1903 |
| 816,285 | Abbott | Mar. 27, 1906 |
| 985,974 | Call | Mar. 7, 1911 |
| 993,653 | Coleman | May 30, 1911 |
| 1,099,238 | Day | June 9, 1914 |
| 1,144,258 | Smith | June 22, 1915 |
| 1,363,389 | Brauer | Dec. 28, 1920 |
| 1,366,139 | Traudt | Jan. 18, 1921 |
| 1,729,951 | Lower | Oct. 1, 1929 |
| 1,953,378 | Vias | Apr. 3, 1934 |
| 1,999,288 | Fjellstedt | Apr. 30, 1935 |
| 2,056,910 | Schauer | Oct. 6, 1936 |
| 2,170,786 | McElroy et al. | Aug. 22, 1939 |
| 2,255,786 | Kendrick | Sept. 16, 1941 |

FOREIGN PATENTS

| Number | Country | Date |
|---|---|---|
| 426,861 | Great Britain | Apr. 10, 1935 |
| 606,178 | Germany | Nov. 26, 1934 |